United States Patent Office 3,650,920
Patented Mar. 21, 1972

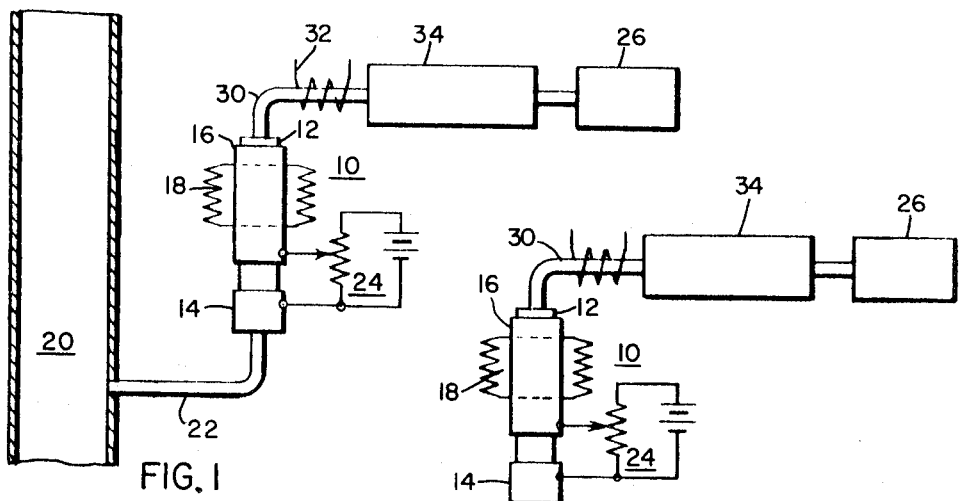
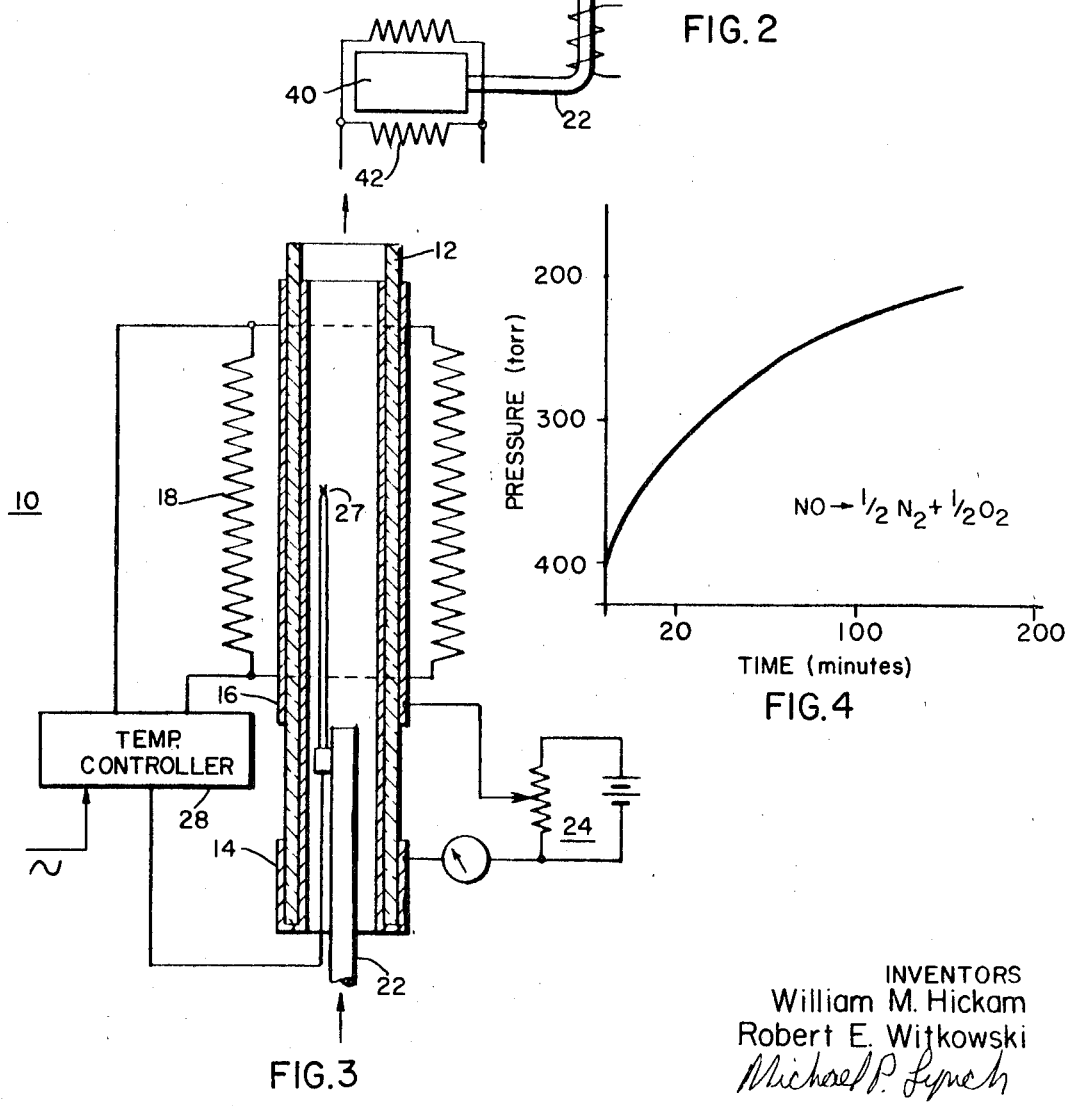

3,650,920
METHOD FOR CONVERTING OXYGEN CONTAINING COMPOUNDS INTO ELEMENTAL CONSTITUENTS
William M. Hickam, Pittsburgh, and Robert E. Witowski, West Mifflin, Pa., assignors to Westinghouse Electric Corporation, Pittsburgh, Pa.
Filed Nov. 14, 1969, Ser. No. 876,790
Int. Cl. B01k *3/12, 1/00*
U.S. Cl. 204—130
4 Claims

ABSTRACT OF THE DISCLOSURE

A method for converting oxygen containing nitrogen compounds and oxygen containing sulfur compounds into elemental constituents including nitrogen, sulfur and oxygen in which an oxygen ion conductive solid electrolyte electrochemical cell electrolytically dissociates and separates the oxygen from the other elemental constituents.

REFERENCE TO RELATED APPLICATIONS

Application Ser. No. 876,791, filed concurrently herewith and assigned to the assignee of the present invention.

BACKGROUND OF THE INVENTION

Field of the invention

This invention relates in general to method and apparatus for electrolytically dissociating gas into constituent elements and more particularly to the use of a solid electrolyte electrochemical cell for converting oxygen containing nitrogen and sulfur compounds into their elemental components.

Description of the prior art

Nitrogen oxides and sulfur oxides are among the most objectionable air pollutants found in the exhaust from combustion apparatus such as fossil fuel furnaces, annealing and processing furnaces, and combustion chambers. The maximum allowable concentration of nitric oxide, nitrogen dioxide, and sulfur dioxide are in the range of 5–10 p.p.m. (parts per million). Prolonged exposure to low levels of these gaseous oxides leads to headaches, irritation of the respiratory tract, and loss of appetite. Short time exposure to 200–700 p.p.m. of nitrogen oxide or nitrogen dioxide may be fatal.

SUMMARY OF THE INVENTION

The invention is an apparatus comprising a solid electrolyte electrochemical cell which dissociates and separates the constituent elements of the gaseous pollutants represented by oxides of nitrogen and sulfur as well as the particulate pollutants represented by gaseous metal oxides and mixtures thereof.

The apparatus comprises a solid electrolyte cell composed of an ion conductive material, such as the calcia stabilized zirconia electrolyte described in U.S. Pat. 3,400,054, issued Sept. 3, 1968 and assigned to the assignee of the present invention. The application of an EMF to electronically conductive electrodes disposed in opposed relationship on the inner and outer surfaces of the electrolyte enhances the rate of dissociation of the gaseous oxides and results in the pumping of oxygen ions from the gaseous oxides present within the tubular electrolyte through the electrolyte to the outer electrode leaving nitrogen, sulfur or a metal at the inner electrode.

DESCRIPTION OF THE DRAWINGS

FIG. 1 is a schematic block diagram of an embodiment of the invention;

FIG. 2 is a schematic block diagram of an alternate embodiment;

FIG. 3 is a section schematic view of a solid electrolyte electrochemical cell incorporated in FIGS. 1 and 2;

FIG. 4 is a graph of a curve illustrating the operation of the electrochemical cell of FIG. 3.

DESCRIPTION OF THE PREFERRED EMBODIMENT

Referring to FIG. 1 there is illustrated a solid electrolyte electrochemical cell 10 connected to a stack 20 in which products of combustion, typically gaseous oxides, are exhausted.

The cell 10 includes a solid electrolyte oxygen ion conductive ceramic tube 12, such as one composed of thoria or zirconia and oxides of calcium or related materials. Suitable electrolyte compositions are disclosed in Ruka et al. The ceramic tube 12 is coated on the inside and outside with electronically conductive electrodes 14 and 16. The electrodes 14 and 16, which are typically porous platinum layers, are electrically insulated one from the other. A cell heater 18 is provided for maintaining the cell 10 at a substantially uniform operating temperature between 400 and 1,000° C.

The cell is connected to the stack 20 by conduit 22. A variable EMF source 24, operatively connected between the cell electrodes 14 and 16, establishes a current flow which renders the cell 10 electrolytically responsive to the gaseous oxides entering the cell through the conduit 22. The gaseous oxides considered to be the most harmful in terms of air pollution are the oxygen containing nitrogen compounds and the nitrogen containing sulfur compounds.

Experimental investigations have verified that the electrolytic operation of the cell 10 results in the dissociation of oxygen containing nitrogen compounds and oxygen containing sulfur compounds into the elemental constituents $N_2$, S and $O_2$. The capability of dissociating otherwise undesirable gaseous oxide pollutants such as NO, $NO_2$, and $SO_2$ into constituent elements fulfills an urgent need in the area of air pollution control.

A vacuum pump 26 draws the gaseous oxides through the cell 10. The applied EMF at electrodes 14 and 16 produces a dissociation of the gaseous oxides and the migration of oxygen ions from the inner electrodes 14 to the outer electrodes 16. The electrolytic dissociation of nitrogen oxides into their stable molecular constituent elements of $N_2$ and $O_2$ is illustrated in the graph of FIG. 4 which represents the dissociation of nitric oxide NO according to the electrochemical cell reaction:

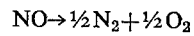

$$NO \rightarrow \tfrac{1}{2}N_2 + \tfrac{1}{2}O_2$$

Application of an EMF to the cell electrodes 14 and 16 and the resulting current flow thereby established, typically 3 milliamperes, results in the dissociation of NO present at electrode 14 and the transfer of oxygen ions through the oxygen ion conductive electrolyte 12. Molecular nitrogen is formed at the inner electrode 14 and molecular oxygen is formed at the outer electrode 16. The reduction of pressure within cell 10 from 400 Torr of NO to 200 Torr of $N_2$ as illustrated in the graph of FIG. 4 is evidence of the complete dissociation of nitrogen and oxygen and the migration of the oxygen ions to the outer electrode 16.

A detailed section view of the cell 10 is illustrated in FIG. 3. The gaseous oxide samples are introduced into the tubular electrolyte 12 by the conduit 22. The dissociation of the gaseous oxide is initiated in the cell volume adjacent to the heater 18 by the EMF developed across the cell electrodes 14 and 16 by the EMF source 24. A temperature sensing device, represented by thermocouple 27, monitors the cell operating temperature and provides a heater control signal to the temperature controller 28. The elevated cell operating temperature maintained by heater 18 increases the ionic conductivity of the cell electrolyte 12.

While most gaseous oxides exhibit a negative dissociation energy, the dissociation of most nitrogen oxides results in positive dissociation energy. For example, the heat of formation of NO is +21.6 Kcal. per mole and the heat of formation of $N_2O$ is +19.7 Kcal. per mole. In the electroyltic dissociation of introgen oxides in the electrochemical cell 10, this positive heat of formation serves to supplement the heat energy supplied to the heater 18 to maintain a desired electrochemical cell operating temperature.

The dissociation of sulfur oxides, which is accomplished in like manner to that described above with reference to the nitrogen oxides, results in the formation of vaporous sulfur at the inner electrode 14. Unlike the nitrogen which remains in a gaseous state, the sulfur in the absence of a heated environment will condense and form a solid deposit. In order to eliminate the adverse effects of sulfur deposits on the cell 10 the sulfur vapor is drawn through a conduit 30 which is heated by heater 32 and deposited out in a condenser 34 as sulfur.

The capability of electrolytically dissociating and condensing out solids by cell 10 as evidenced in the dissociation of sulfur oxides into molecular sulfur and oxygen, renders the electrochemical cell 10 useful in the vaporization and electrolytic dissociation of metal oxides or mixtures thereof which often exist as particulate pollutants. While this application of the electrochemical cell 10 is directly related to pollution control, the electrolytic dissociation of gaseous metal oxide mixtures of one or more metal oxides can be utilized in the depositing of metallic films, such as required in thin film and semiconductor fabrication. This unique application is illustrated in FIG. 2 in which a metal oxide mixture within a container 40 is heated by heater 42 to produce a metal oxide vapor which is drawn through the heated conduit 22 to the cell 10 by a vacuum pump 26. Dissociation of the oxygen from the metal oxide vapor occurs within cell 10 as a result of the EMF applied to the cell electrodes 14 and 16 by the EMF source 24. The vaporous metal remaining within the cell 10 is drawn through the heated conduit 30 and deposited out in the condenser 34. A suitable substrate material may be provided within condenser 34 onto which a desirable coating of the metal is deposited. Examples of metal oxides for which the resulting metals are volatile within the operating temperature of the stabilized zirconia electrolyte are as follows:

| Oxide | T. (° C.) for 1 torr vapor pressure of oxide | T. (° C.) for $10^{-1}$ torr vapor pressure of metal |
|---|---|---|
| $Sb_2O_3$ | 574 | 678 |
| CdO | 1,000 | 264 |
| PbO | 943 | 718 |
| $SeO_2$ | 157 | 234 |

In addition to making sure metals from oxides, the cell can be utilized to produce oxygen deficient solids covering the range from the oxide to the metal. The process can be reversed starting with the pure metal vapors and utilizing the electrochemical cell to introduce oxygen coulombically for making solids containing known oxygen additions. The system permits continuous deposition on a desired substrate for thin film device manufacture.

While the embodiments illustrated in FIGS. 1 and 2 utilize open ended tubular electrolyte members and flowing gas systems it is apparent that the operation of the cell in both embodiments could be supported by numerous cell designs.

Furthermore, in the event the temperature of the sample supplied to the cell by either the stack 20 or the metal oxide container 40 is sufficient to support cell operation, the cell heater 18 can be eliminated.

Various modifications may be made within the scope of this invention.

We claim:

1. A method of converting oxygen containing nitrogen compounds and oxygen containing sulfur compounds into the elemental constituents of nitrogen, sulfur and oxygen, comprising the steps of, maintaining the oxygen containing compound in a gaseous form, supplying said oxygen containing compound to a first electrode of an oxygen ion conductive solid electrolyte electrochemical cell having a first and second electrode, applying an EMF to the electrodes of said solid electrolyte electrochemical cell to dissociate the oxygen containing compound into elemental constituents including oxygen ions, the oxygen ions resulting from said electrolytic dissociation migrating through the solid electrolyte of said solid electrolyte electrochemical cell to said second electrode, and removing the elemental constituents of the oxygen containing compound remaining at said first electrode.

2. The method as claimed in claim 1 including, maintaining the solid electrolyte electrochemical cell at a temperature sufficient to support the electrolytic dissociation of the oxygen containing compound.

3. The method as claimed in claim 1 including, condensing out select elemental constituents as solids.

4. The method as claimed in claim 1 including, adjusting the EMF to provide substantially total dissociation of the oxygen present in the oxygen containing compound.

References Cited

UNITED STATES PATENTS 3,400,054    9/1968    Ruka et al.

JOHN H. MACK, Primary Examiner

R. L. ANDREWS, Assistant Examiner

UNITED STATES PATENT OFFICE
CERTIFICATE OF CORRECTION

Patent No. 3,650,920  Dated March 21, 1972

Inventor(s) William M. Hickam and Robert E. Witkowski

It is certified that error appears in the above-identified patent and that said Letters Patent are hereby corrected as shown below:

It is certified that error appears in the above-identified patent and that said Letters Patent are hereby corrected as shown below:

Title page, cancel "Robert E. Witowski" and substitute -- Robert E. Witkowski --.

Signed and sealed this 24th day of October 1972.

(SEAL)
Attest:

EDWARD M. FLETCHER, JR.
Attesting Officer

ROBERT GOTTSCHALK
Commissioner of Patents